(12) United States Patent
Hosmer et al.

(10) Patent No.: US 8,064,890 B1
(45) Date of Patent: *Nov. 22, 2011

(54) SYSTEM AND METHOD FOR DEVELOPING INFORMATION FOR A WIRELESS INFORMATION SYSTEM

(75) Inventors: Basil C. Hosmer, Winchester, MA (US); Brian Connolly, Seattle, WA (US); Saurav Chatterjee, Foster City, CA (US); Samuel MacDonnell, Montara, CA (US); Norman K. Meyrowitz, San Francisco, CA (US); James T. Morris, San Francisco, CA (US); Laurent E. Sellier, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,839

(22) Filed: Apr. 9, 2010

Related U.S. Application Data

(63) Continuation of application No. 10/791,299, filed on Mar. 1, 2004, now Pat. No. 7,706,782.

(51) Int. Cl.
*H04M 3/42* (2006.01)

(52) U.S. Cl. ............... 455/414.1; 455/414.4; 455/414.3; 455/456.3; 455/3.02; 455/3.06; 455/412.1; 455/412.2; 455/466; 709/206

(58) Field of Classification Search ............... 455/414.1, 455/414.4, 414.3, 456.3, 3.02, 3.06, 412.1, 455/412.2, 466; 709/206
See application file for complete search history.

(56) References Cited

U.S. PATENT DOCUMENTS

| | | | |
|---|---|---|---|
| 5,727,171 A | 3/1998 | Iachetta | |
| 5,751,968 A | 5/1998 | Cohen | |
| 6,002,675 A | 12/1999 | Ben et al. | |
| 6,725,022 B1 | 4/2004 | Clayton et al. | |
| 6,732,179 B1 | 5/2004 | Brown et al. | |
| 6,819,669 B2 | 11/2004 | Rooney | |
| 6,850,965 B2 | 2/2005 | Allen | |
| 7,031,306 B2 | 4/2006 | Amaral et al. | |
| 7,047,301 B2 | 5/2006 | Skene et al. | |
| 7,177,945 B2 | 2/2007 | Hong et al. | |
| 7,225,267 B2 | 5/2007 | Key et al. | |
| 7,254,605 B1 | 8/2007 | Strum | |
| 7,260,635 B2 | 8/2007 | Pandya et al. | |
| 7,324,540 B2 | 1/2008 | Vangal et al. | |
| 7,330,717 B2 | 2/2008 | Gidron et al. | |
| 7,706,782 B1 * | 4/2010 | Hosmer et al. ............. | 455/414.1 |
| 2002/0078158 A1 | 6/2002 | Brown et al. | |
| 2002/0106998 A1 | 8/2002 | Presley et al. | |
| 2002/0107830 A1 | 8/2002 | Nanja | |

(Continued)

OTHER PUBLICATIONS

U.S. Patent Office, U.S. Appl. No. 10/791,299, filed Mar. 1, 2004, in Office Action, mailed Jan. 24, 2007.

(Continued)

*Primary Examiner* — Patrick Edouard
*Assistant Examiner* — Justin Lee
(74) *Attorney, Agent, or Firm* — Fish & Richardson P.C.

(57) ABSTRACT

A system and method is described for providing data to a mobile information system. A broadcast server receives information preferences from a plurality of subscribers to the mobile information system. The broadcast server aggregates these information preferences and transmits the aggregated information preferences to at least one data source providers. The data source providers then assemble data for the mobile information system using the aggregated information preferences.

12 Claims, 5 Drawing Sheets

U.S. PATENT DOCUMENTS

| | | |
|---|---|---|
| 2002/0146008 A1 | 10/2002 | Kaplan |
| 2003/0005455 A1 | 1/2003 | Bowers |
| 2003/0084184 A1 | 5/2003 | Eggleston et al. |
| 2004/0034723 A1 | 2/2004 | Giroti |
| 2004/0071145 A1 | 4/2004 | Ha et al. |
| 2004/0090943 A1 | 5/2004 | da Costa et al. |
| 2004/0176085 A1 | 9/2004 | Phillips et al. |
| 2004/0199635 A1 | 10/2004 | Ta et al. |
| 2005/0177633 A1 | 8/2005 | Plunkett |
| 2007/0055615 A1 | 3/2007 | Howell et al. |
| 2007/0094086 A1 | 4/2007 | Ikezawa et al. |

OTHER PUBLICATIONS

U.S. Patent Office, U.S. Appl. No. 10/791,299, filed Mar. 1, 2004, in Office Action, mailed Nov. 2, 2007.

U.S. Patent Office, U.S. Appl. No. 10/791,299, filed Mar. 1, 2004, in Office Action, mailed December.

\* cited by examiner

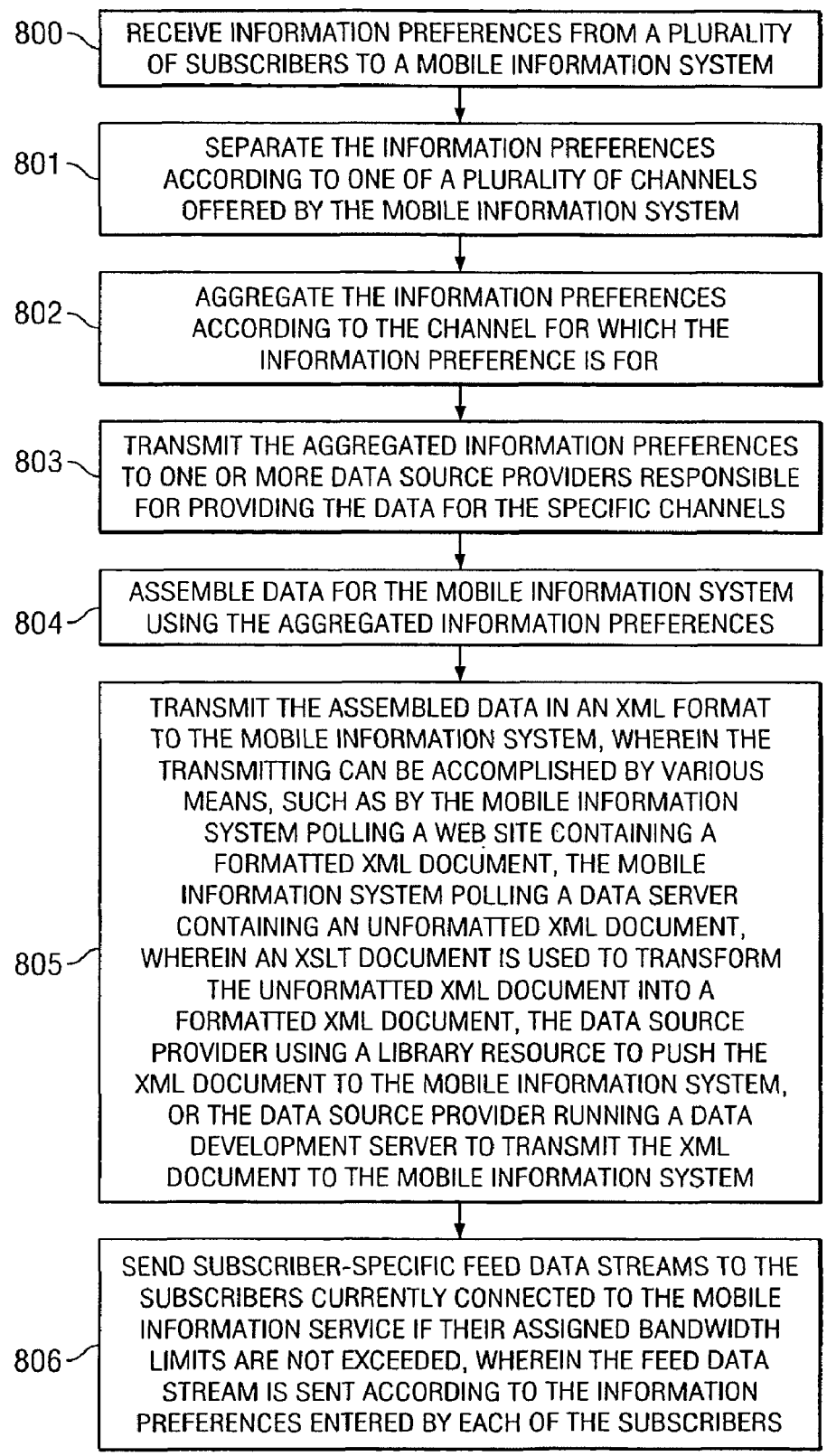

SYSTEM AND METHOD FOR DEVELOPING INFORMATION FOR A WIRELESS INFORMATION SYSTEM

CROSS-REFERENCE TO RELATED APPLICATIONS

The present application is a continuation of and claims the benefit of the priority of U.S. patent application Ser. No. 10/791,299, entitled "System and Method for Developing Information for a Wireless Information System," and filed Mar. 1, 2004, the disclosure of which is hereby incorporated by reference. The present application is related to U.S. patent application Ser. No. 10/791,298, entitled "MOBILE RICH MEDIA INFORMATION SYSTEM"; and U.S. patent application Ser. No. 10/790,311 entitled "BANDWIDTH MANAGEMENT SYSTEM," the disclosures of which are hereby incorporated by reference.

TECHNICAL FIELD

The present invention relates, in general, to electronic information systems, and, more specifically, to providing data for mobile information systems.

BACKGROUND OF THE INVENTION

The world today is driven by information. Much of this information is accessible electronically, whether over the Internet or through a private intranet. People typically access desired information by connecting to the Internet or intranet using wired network connections or short-ranged wireless protocols, such as wireless fidelity (Wi-Fi), IEEE 802.11, BLUETOOTH™, or the like. These short-ranged wireless protocols allow for high bandwidth connectivity, which lends to their popularity. However, these access methods are limited to the availability of the wired or wireless access point.

Attempts have been made in the past to implement information access over the wireless telephone networks. However, because these networks are designed mostly for voice traffic, the available bandwidth capability for data transmission is far less than the broadband capabilities of the short-ranged wireless protocols. As such, these previous phone-based information systems typically provided only textual information or some kind of Web browsing at very high latency.

One of the first technologies used to pass information to a wireless phone user was Small Message Service (SMS). SMS is a text service that enables short messages of generally no more than 140-160 characters in length to be sent and transmitted from a mobile phone. In such a system, a user would typically log onto a particular Web site to sign up and enter information preferences or sign up through some interactive telecommunications service to receive periodic small messages of interest. For example, a user would call into a service provider's interactive voice response (IVR) system and sign up to receive sports scores for their favorite basketball team or teams. Thereafter, when the service provider compiles the scores for the user-requested team or teams, a short text message would be forwarded to the user's mobile phone, or whatever other mobile device that was designated. The SMS information system, thus, utilizes a broadcast paradigm to deliver information.

The information presented by the service provider or SMS server is gathered and formed into the individual messages for the user. Each user interacts with an out of band system to enter the user's data preferences. Through either a Web site or interactive voice response (IVR) system, the user enters his or her preferences. Those preferences are then communicated to the service provider or SMS server. The preferences are typically entered into a database and associated with the particular user. Therefore, not only is the amount and format of data limited, user preferences are entered out of band. This out of band preference entry system many times delays delivery of the newly requested or changed information while the preferences are communicated to the service provider or SMS server.

The next step in wireless information technology was largely driven by the explosion of the World Wide Web (WWW). Web browsers, which are so prevalent in everyday life, were basically scaled down for use in mobile phones. These microbrowsers generally provide browser-like functionality to the mobile phone, albeit at a much reduced level. Due to the typically limited memory and processing power of mobile phones, early microbrowsers used Wireless Access Protocol (WAP) and Wireless Mark-up Language (WML), which are protocols that attempt to mimic the full-scale standards of hypertext transfer protocol (HTTP) and hypertext mark-up language (HTML). More recently, however, as the ability of the mobile phones has increased, some microbrowsers actually use HTML browsers.

The paradigm of the microbrowser operates in much the same manner as a full-scaled Web browser. A Web page, which may be a WAP page or an HTML page, is downloaded from a Web server, again, which could be a WAP server or HTTP server, to a user's phone. Either by activating standard navigation elements or hypertext links, subsequent Web pages are downloaded to the microbrowser for the user to view. The user's interaction is similar to that in a Web browser except without the graphical richness, which has been either removed or drastically reduced in order to accommodate the limited bandwidth availability in mobile telecommunication systems for data traffic. The user may access typical browser navigational elements, such as Back or Forward or, through some substantial key-strokes, enter a Web site address or Uniform Resource Locator (URL). Because of the device and bandwidth restrictions in the mobile telecommunication area, the main noticeable difference between the microbrowser paradigm and the Web browser is that the majority of information on the "micro" pages is textual.

In application, the microbrowser offers a greater variety and reach of information than the SMS systems. Moreover, the user is afforded a greater interactivity by being allowed to "surf" to any desired and compatible Web site or Web page. However, a user interacts with pre-existing Web sites or Web pages, or some kind of server page, such as SUN MICROSYSTEM INC.'s JAVA™ SERVER PAGE (JSP™), MICROSOFT CORPORATION's ACTIVE SERVER PAGE (ASP™), and the like, that may generate the Web site or Web page dynamically as the user navigates to the page. Therefore, an information system that utilizes an Internet or WWW browsing paradigm, does so with pre-existing sites, pages, or server pages. The user typically has no ability to enter preferences as to what kind of data to receive when browsing to the compatible Web pages or Web sites.

Moreover, in operation, the user experience could generally be described as click-and-wait, rather than click-and-view. Because a relatively large amount of data is transmitted over the wireless network to the phone for each Web page, a large latency existed between the page request and the final download and display of the page. This large latency period experienced by most wireless phone Internet users limited the appeal of the microbrowser system. Furthermore, because many service providers placed a per minute usage charge on accessing the Internet over a mobile phone, the long latency generally meant higher costs for a service where the waiting time could exceed the actual information interaction time.

Several ideas followed the microbrowser attempting to address the problems it exhibited. One solution that addressed the long latency periods and lack of graphical experience was the stored-page approach. An example of this type of service is iAnywhere Solutions, Inc.'s AVANTGO™. The AVANTGO™ system includes software on the user's device which allows the user to select particular Web sites or Web pages to store on the user's device. While the user's device is physically connected to the Internet, either using a wired or wireless connection, the AVANTGO™ software accesses the user's preferred Web sites and stores those HTML pages directly on the user's device memory. The user is then able to "surf" through the saved Web pages even after disconnecting the device from the Internet connection. Because the Web pages are stored directly on the mobile device, almost no latency exists when the user is viewing the various, saved Web pages. However, the trade-off made for the low latency is the fact that the data being viewed is no longer dynamic Web content. Moreover, as with the regular browser paradigm, the user has no means for customizing the information other than merely selecting a particular Web site or Web page.

The latest improvement, which was applied to the microbrowser paradigm, is generally referred to as a push browser service. Instead of waiting for a user to request a particular Web page, the push browser is proactively sent an HTML or WML page from the server. Therefore, when a user accesses the microbrowser, at least some content is already resident on the device, which initially reduces the latency. The user's interaction remains the same as the regular microbrowser, which basically mimics the user interaction of Web browsers without the rich graphics. The limitation to the push browser is that only a limited number of HTML/WML pages are stored. Once the user navigates or browses through all of the stored pages, the advantages achieved by the push system are gone. Without the stored pages, new pages are generally downloaded from the Web server on request of the user, which results in the long latency periods experienced in the normal microbrowsers.

An addition to the push technology was attempted in POINTCAST INC.'s POINTCAST™ system. The POINTCAST™ system was an information system for desktop computers that compiled and broadcast a wide variety of information items. Subscribers to this system received the broadcasts and stored the information items locally. By entering preferences to the user's local system, the client-side application of POINTCAST™ generally filtered the presentation of the information to the user based on those user preferences. The POINTCAST™ server would periodically update the information items, which the user could then view if those updates corresponded to the items the user preferred to view. However, the bandwidth requirements for transmitting and receiving all of the information typically clogged networks and caused long periods of network latency. While users experienced relatively low latency in accessing the information on the user's device, the user would typically experience a slow network clogged with a large amount of data being transmitted to every POINTCAST™ subscriber, much of which may not even be used.

The data for the POINTCAST™ system is compiled by the POINTCAST™ service provider. All of that data is broadcast to every subscriber. The subscriber typically has no direct interaction with the POINTCAST™ server to customize or even limit the data being transmitted to the user's device. The user, instead, enters data preferences locally on the user's device. The local preferences are then used as a filter of the large block of broadcast data stored on the user's device.

BRIEF SUMMARY

The present invention is directed to a system and method for providing data to a mobile information service. The mobile information service maintains a plurality of channels to which a user may subscribe. Moreover, the user is able to enter preferences as to what type of information he or she wishes to receive within each channel. The mobile information service allows users to interact directly with the service provider through in-band communication to enter such subscription requests or preferences. In-band communication refers to a two-way communication system between the user and the service provider. This means that the user transmits subscription information or requests on the same communication system that the service provider uses to transmit the information to the user's device. Through this two-way communication system, the information service provider gathers user preferences regarding the particular channel data that the user wishes to obtain within each channel the user subscribes to.

An enhanced broadcast server is used by the information service provider to aggregate all of the user preferences on a per channel basis. This per channel aggregate is then communicated to the data source provider for that channel in order to compile the data feed or data stream for that particular channel. The aggregate preference includes no information that may be used to identify the user in any way. In this manner, the data source provider transmits a pure data stream to the enhanced broadcast server that provides only the information requested by the aggregate of the users who subscribe to that particular channel. Once this aggregate data stream is received by the enhanced broadcast server, the individual user preferences, maintained at the enhanced broadcast server, are used to compile the individual user data streams for ultimate broadcast to the subscribing users. This subscriber-specific data stream includes the data used for populating each channel that the user subscribes to, taking into consideration each of the preferences entered by the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 8 is a flowchart illustrating steps performed in implementing another embodiment of the present invention.

DETAILED DESCRIPTION OF THE INVENTION

Figure 1:
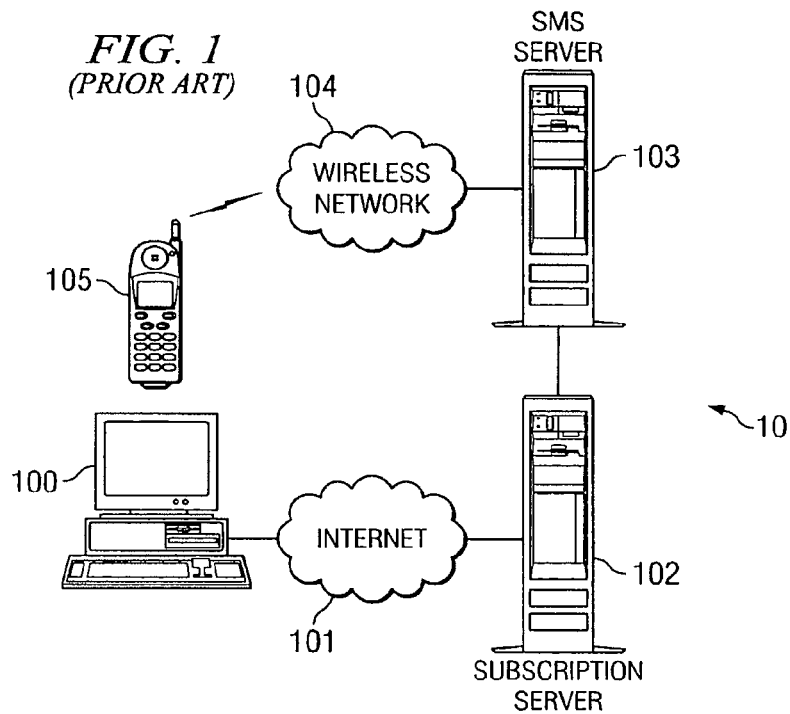
FIG. 1 is a block diagram illustrating a typical SMS messaging system.

FIG. 1 is a block diagram illustrating typical SMS messaging system 10. A user subscribes to SMS messaging system 10 using computer 100 to connect to subscription server 102 over Internet 101. Using computer 100 the user enters subscription information and data preferences on subscription server 102. Subscription server 102 communicates that user-entered information to SMS server 103. SMS server 103 compiles the individual SMS messages that contain the information that the user requested to receive. These SMS messages are periodically transmitted to mobile device 105 over wireless network 104 for the user to view. Thus, while the user receives specifically tailored information, the user's preferences are all entered out of band through Internet 101.

Figure 2:
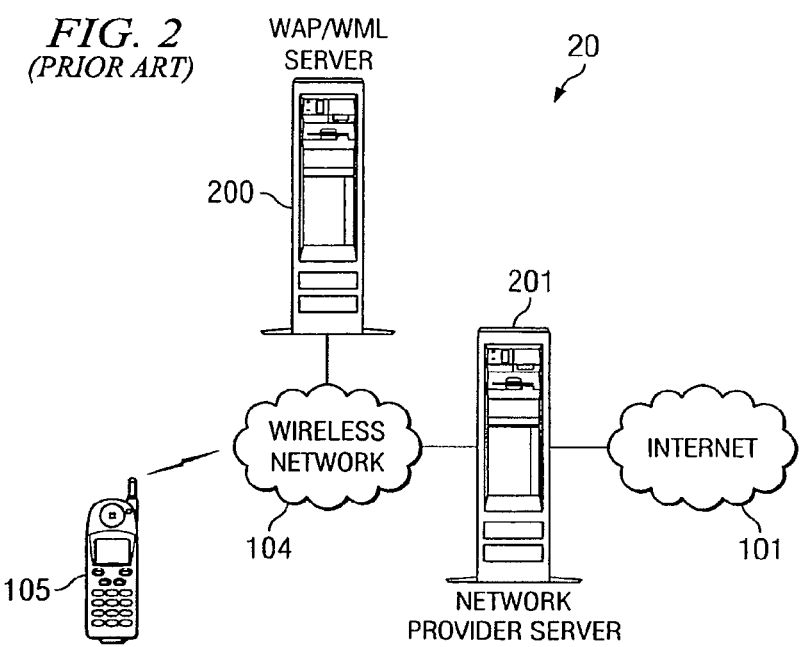
FIG. 2 is a block diagram illustrating a typical mobile browser system.

FIG. 2 is a block diagram illustrating typical mobile browser system 20. When the user desires to access information on mobile device 105, the user will establish a connection to Internet 101 over wireless network 104 and network provider server 201. Alternatively, if the user is accessing a WAP/WML system, the user establishes a connection to WAP/WML server 200 over wireless network 104. In mobile browser system 20, the user only interacts with existing content. There are no means for the user to enter preferences as to the type of information to receive.

Figure 3:
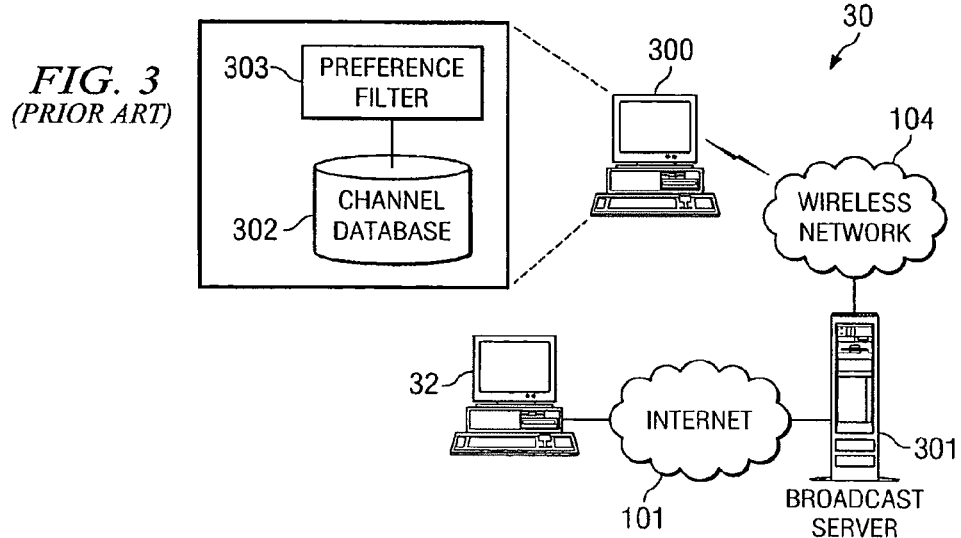
FIG. 3 is a block diagram illustrating a typical push browser system.

FIG. 3 is a block diagram illustrating typical push browser system 30. To subscribe to push browser system 30, the user transmits subscription information to broadcast server 301 using computer 31 connected over Internet 101. Once the subscription is entered, broadcast server 301 transmits a stream comprising all data that is provided in push browser system 30 to mobile device 300 over wireless network 104. All of this information is stored locally on mobile device 300 in channel database 302. The user enters his or her information preferences locally on mobile device 300. These preferences are stored in preference filter 303. When the user activates the client portion of push browser system 30, preference filter 303 is used to filter out all of the data in channel database 302 that the user does not wish to view. Therefore, only the desired information is presented to the user on mobile device 300, even though all of the data is stored locally in channel database 302.

Figure 4:
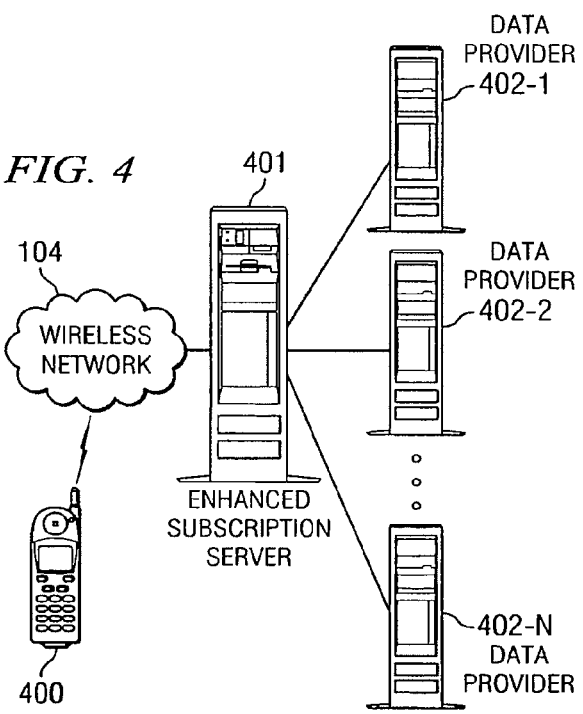
FIG. 4 is a block diagram illustrating one embodiment of the present invention.

FIG. 4 is a block diagram illustrating one embodiment of the present invention. Enhanced mobile information system 40 delivers any number of information channels to a user of mobile device 400 over wireless network 104. The user may subscribe to these channels and enter preferences for the information using mobile device 400. The user preferences are transmitted to enhanced broadcast server 401 over mobile network 104. Enhanced broadcast server 401 uses these preferences along with channel data provided by data source providers, such as data providers 402-1-402-N to generate the channel- and preference-specific data feeds to transmit back to mobile device 400.

Figure 5:
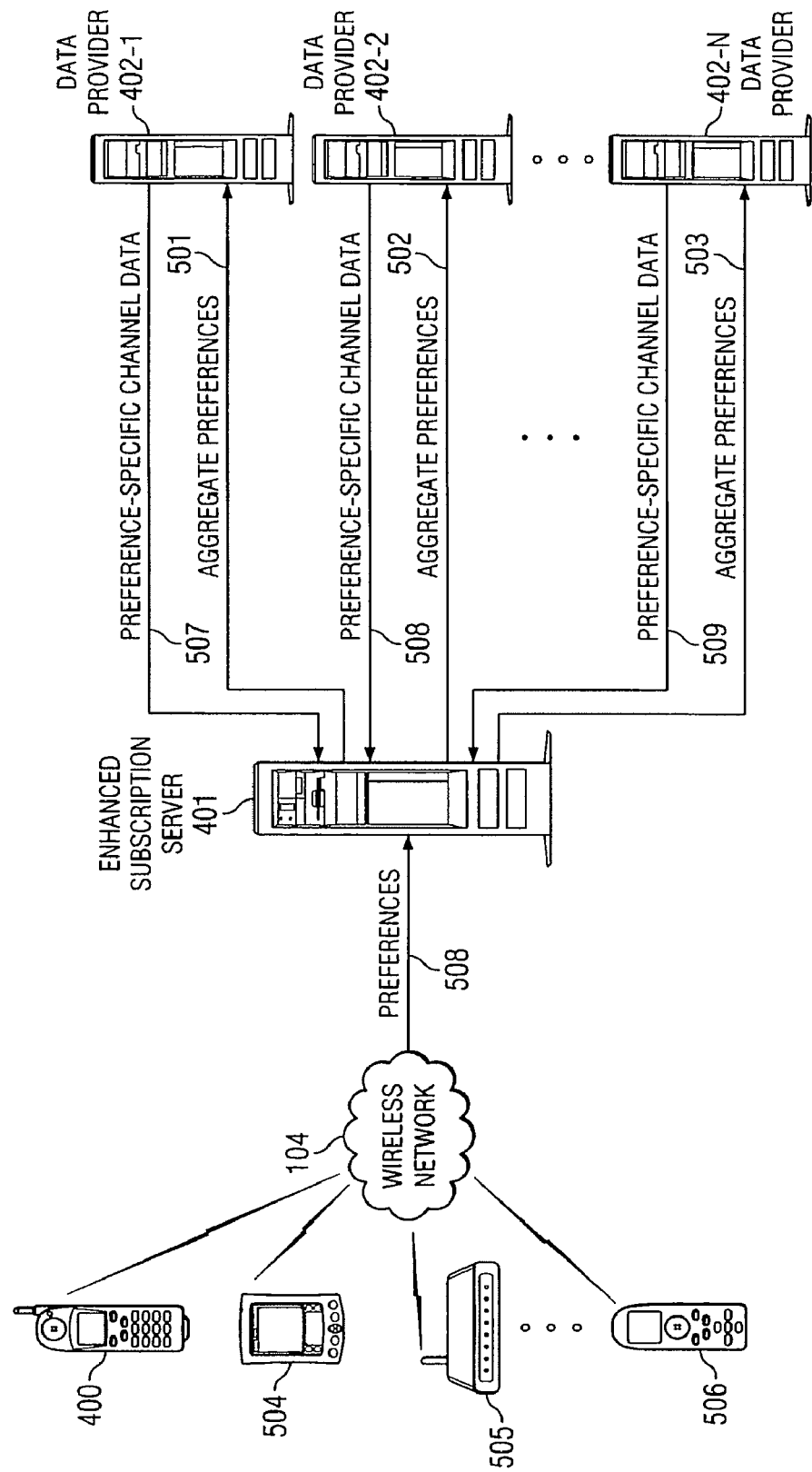
FIG. 5 is a block diagram illustrating another embodiment of the present invention.

FIG. 5 is a block diagram illustrating another embodiment of the present invention. The users at mobile devices 400 and 504-506 each transmit subscription and preference data to enhanced broadcast server 401 relating to the delivery of enhanced mobile information system 40. Enhanced broadcast server 401 compiles each of individual user preferences 500 into aggregate preferences 501-503 for each channel offered by enhanced mobile information system 40.

Each of the channels provided by enhanced mobile information system 40 are compiled from data provided by a data source provider, such as data providers 402-1-402-N. Data providers 402-1-402-N each provide data for creating each of the informational channels delivered by enhanced mobile information system 40. In operation of enhanced mobile information system 40, enhanced broadcast server 401 transmits each channel-specific aggregate preference, such as aggregate preferences 501-503, to the corresponding data source provider that provides the data for the particular channel, such as one of data providers 402-1-402-N. In compiling the data stream for the particular channel, the data source provider, such as data provider 402-1, for example, uses the aggregate preference received from enhanced broadcast server 401 to compile the data for the channel.

In this manner of operation, only the data that meets the preferences of any of the users subscribing to that particular channel is gathered and transmitted back to enhanced broadcast server 401, thus, making optimal use of the available bandwidth between data provider 402-1 and enhanced broadcast server 401. After compiling the source channel data, data providers 402-1-402-N transmit preference-specific channel data 507-509 back to enhanced broadcast server 401. Enhanced broadcast server 401 then processes preference-specific channel data 507-509 into individual, subscriber-specific feed data streams to match each preference entered by any of the users.

Figure 6:
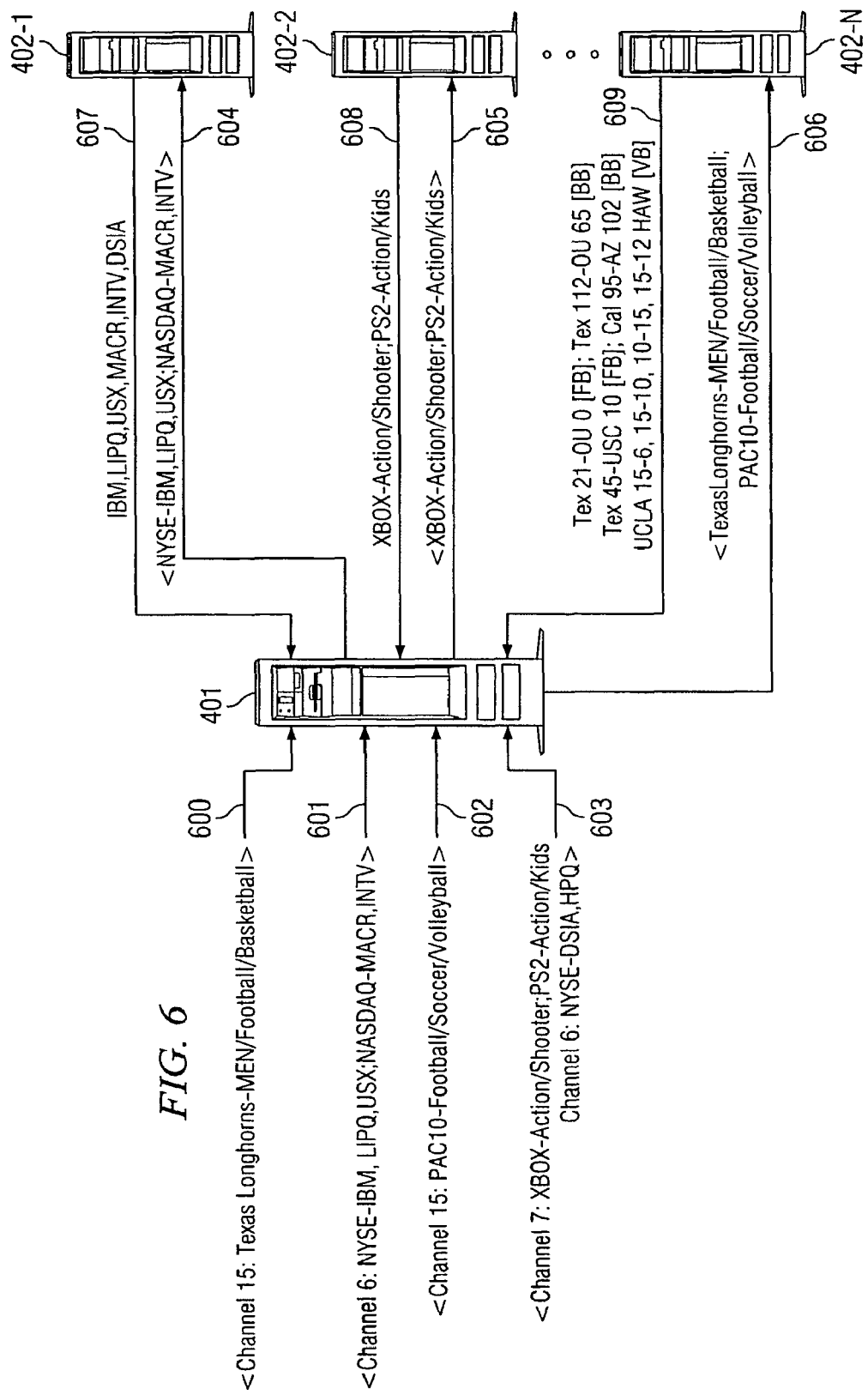
FIG. 6 is a block diagram illustrating preference-related streams used in another embodiment of the present invention.

FIG. 6 is a block diagram illustrating preference-related streams used in another embodiment of the present invention. User preference streams 600-603 are idealized/conceptualized data streams representing user preferences entered in the mobile enhanced information system. When the user device first communicates with enhanced subscription server 401, a session is established between the user device and enhanced subscription server 401. Authentication data from the user's device is received and checked by enhanced subscription server 401 in order to create an authenticated channel for communication. Once the session has been authorized, any further communication from the user's device coming into enhanced subscription server 401 over the authenticated channel will be associated with that particular user. The user's device may then begin transmitting user preference streams 600-603. Referring to user preference stream 600, the user is preferring to receive information from channel 15 that concerns a college sports team, the TEXAS LONGHORNS™, and, more specifically, the men's sports of football and basketball. Similarly, user preference stream 601 shows a user preference to receive data from channel 6 concerning stocks, and, more specifically, the stock quote of IBM, Hewlett-Packard, and US Steel from the New York Stock Exchange, and Macromedia and Intervoice from the NASDAQ™.

By having enhanced subscription server 401 accept the user preferences directly from the user and then compile the aggregate preference to be sent to the source data providers, the provision of the data by the source data providers is decoupled from the users. This decoupling allows greater control of the information delivery by the enhanced mobile information service provider. For example, aggregate preference stream 604 compiles data from the preferences for channel 6 while aggregate preference streams 605 and 606 compile data from the preferences for channels 7 and 15, respectively.

Enhanced broadcast server 401 transmits aggregate preference streams 604-606 to the corresponding data source provider for the specific channel, such as data providers 402-1-402-N. Data providers 402-1-402-N use aggregate preference streams 604-606 to compile the aggregate channel data for the particular channel being subscribed to. For example, data provider 402-1 takes aggregate preference stream 604 and compiles channel data stream 607 that consists of the stock quotes for IBM, Hewlett-Packard, Macromedia, Intervoice, and the Dow Jones Industrial Average. Channel data stream 607 is then transmitted by data provider 402-1 back to enhanced broadcast server 401. Similarly, data providers 402-2 and 402-N use aggregate preference streams 605 and 606 to compile channel data streams 608 and 609, which are then transmitted back to enhanced broadcast server 401.

Enhanced broadcast server 401 uses channel data streams 607-609 to create the individual feed data streams to transmit back to mobile devices 400 and 504-506. For example, using channel data stream 609, enhanced broadcast server 401 sends a feed data stream to mobile device 400 that includes sports scores for the TEXAS LONGHORNS™ football team in games against the University of Oklahoma (OU) with the score of Texas 21-OU 0. Mobile device 400 also receives a basketball score of Texas 112-OU 65 and another football score of Texas 45-USC 10. Enhanced broadcast server 401, therefore, divides the aggregate information in channel data streams 607-609 into individualized, subscriber-specific feed data streams that provide the data for the enhanced mobile information system.

Figure 7:
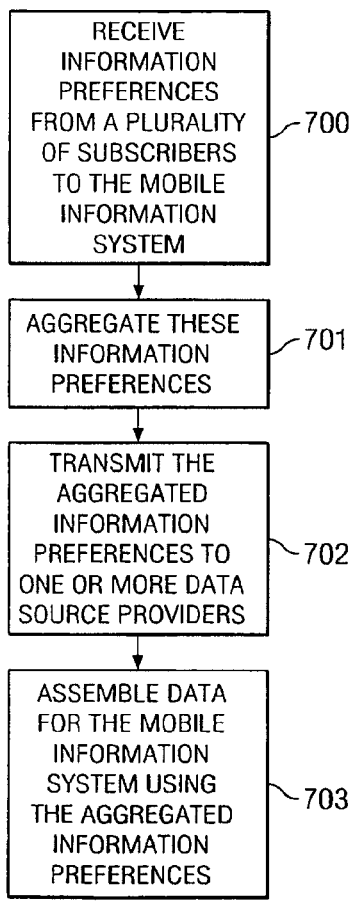
FIG. 7 is a flowchart illustrating steps performed in implementing an additional embodiment of the present invention.

FIG. 7 is a flowchart illustrating steps performed in implementing an additional embodiment of the present invention. In step 700, information preferences are received from a plurality of subscribers to the mobile information system. These information preferences are then aggregated by a broadcast server in step 701. The aggregated information preferences are then transmitted, in step 702, to at least one data source providers. In step 703, the data source providers then assemble data for the mobile information system using the aggregated information preferences.

FIG. 8 is a flowchart illustrating steps performed in implementing another embodiment of the present invention. In step 800, information preferences are received from a plurality of subscribers to a mobile information system. In step 801, the information preferences are separated according to one of a plurality of channels offered by the mobile information system. The information preferences are then aggregated, in step 802, according to the channel for which the information preference is for. The aggregated information preferences are transmitted to one or more data source providers responsible for providing the data for the specific channels in step 803.

In step 804, the data source provider assembles data for the mobile information system using the aggregated information preferences. The assembled data is then transmitted, in step 805 to the mobile information system. The assembled data may be transmitted in various different data formats including data-descriptive meta languages, such as XML. Moreover, the transmitting can be accomplished by various means, such as by the mobile information system polling a Web site containing a formatted XML document, the mobile information system polling a data server containing an unformatted XML document, wherein an Extensible Stylesheet Language for Transformation (XSLT) is used to transform the unformatted XML document into a formatted XML document, the data source provider using a library resource to push the XML document to the mobile information system, or the data source provider running a dedicated server for compiling and transmitting information in an XML document to the mobile information system. In step 806, the subscriber-specific feed data streams are then sent to the subscribers currently connected to the mobile information service if their assigned bandwidth limits are not exceeded, wherein the feed data stream is sent according to the information preferences entered by each of the subscribers.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer implemented method, comprising:
   generating an aggregate information preference for a data source provider based on two or more information preferences sent by two or more wireless subscriber devices, respectively, wherein the two or more information preferences request different data streams that are provided by the data source provider;
   transmitting the aggregate information preference to the data source provider;
   receiving an aggregate data stream from the data source provider; and
   providing two or more data streams to the two or more wireless subscriber devices, respectively, based on the two or more information preferences and the received aggregate data stream.

2. The method of claim 1, wherein providing the two or more data streams comprises determining whether a wireless subscriber device is connected and sending a subscriber-specific data stream to the wireless subscriber device based on an output of the determination.

3. The method of claim 2, wherein sending the subscriber-specific data stream to the wireless subscriber device comprises determining a bandwidth limit associated with the wireless subscriber device.

4. The method of claim 1, wherein providing the two or more data streams comprises sending an aggregate of two or more data streams received from two or more data source providers, respectively, to a wireless subscriber device.

5. A system comprising:
   two or more wireless subscriber devices; and
   one or more servers operable to interact with the two or more wireless subscriber devices and to perform operations comprising:
   generating an aggregate information preference for a data source provider based on two or more information preferences sent by the two or more wireless subscriber devices, respectively, wherein the two or more information preferences request different data streams that are provided by the data source provider;

transmitting the aggregate information preference to the data source provider;

receiving an aggregate data stream from the data source provider; and providing two or more data streams to the two or more wireless subscriber devices, respectively, based on the two or more information preferences and the received aggregate data stream.

6. The system of claim 5, wherein providing the two or more data streams comprises determining whether a wireless subscriber device is connected and sending a subscriber-specific data stream to the wireless subscriber device based on an output of the determination.

7. The system of claim 6, wherein sending the subscriber-specific data stream to the wireless subscriber device comprises determining a bandwidth limit associated with the wireless subscriber device.

8. The system of claim 5, wherein providing the two or more data streams comprises sending an aggregate of two or more data streams received from two or more data source providers, respectively, to a wireless subscriber device.

9. A non-transitory computer readable medium embodying a computer program operable to cause one or more machines to perform operations comprising:

generating an aggregate information preference for a data source provider based on two or more information preferences sent by two or more wireless subscriber devices, respectively, wherein the two or more information preferences request different data streams that are provided by the data source provider;

transmitting the aggregate information preference to the data source provider;

receiving an aggregate data stream from the data source provider; and providing two or more data streams to the two or more wireless subscriber devices, respectively, based on the two or more information preferences and the received aggregate data stream.

10. The medium of claim 9, wherein providing the two or more data streams comprises determining whether a wireless subscriber device is connected and sending a subscriber-specific data stream to the wireless subscriber device based on an output of the determination.

11. The medium of claim 10, wherein sending the subscriber-specific data stream to the wireless subscriber device comprises determining a bandwidth limit associated with the wireless subscriber device.

12. The medium of claim 9, wherein providing the two or more data streams comprises sending an aggregate of two or more data streams received from two or more data source providers, respectively, to a wireless subscriber device.

* * * * *

UNITED STATES PATENT AND TRADEMARK OFFICE
CERTIFICATE OF CORRECTION

| | | |
|---|---|---|
| PATENT NO. | : 8,064,890 B1 | |
| APPLICATION NO. | : 12/757839 | |
| DATED | : November 22, 2011 | |
| INVENTOR(S) | : Basil C. Hosmer et al. | |

It is certified that error appears in the above-identified patent and that said Letters Patent is hereby corrected as shown below:

Title page, Column 1 (Inventors), Line 2, delete "Brian Connolly," and insert
-- Brian P. Connolly, --, therefor.

Title page, Column 1 (Inventors), Line 4, delete "Samuel MacDonnell," and insert
-- Samuel J. MacDonnell, --, therefor.

Signed and Sealed this
Thirteenth Day of March, 2012

David J. Kappos
*Director of the United States Patent and Trademark Office*